Dec. 29, 1925.                                                1,567,073
E. MOCIGEMBA
SCREW PUMP
Filed July 23, 1925
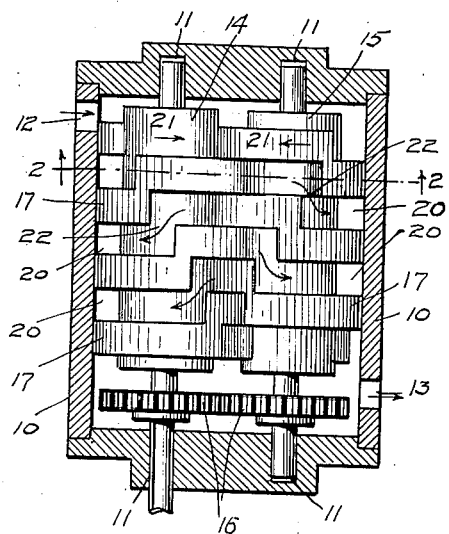
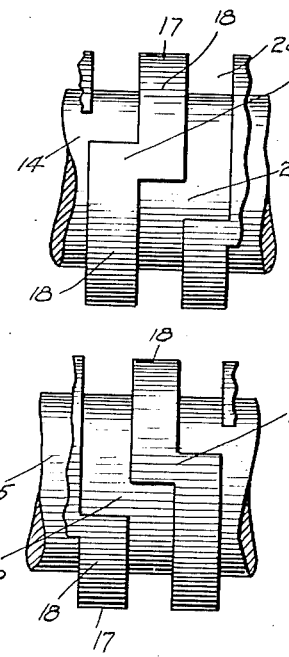
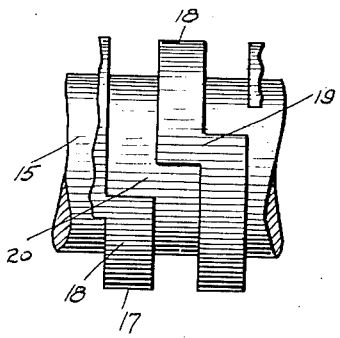
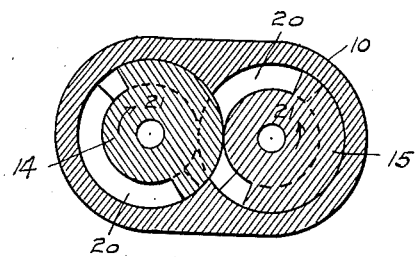
EMANUEL MOCIGEMBA
INVENTOR
BY
ATTORNEY.

Patented Dec. 29, 1925.

1,567,073

UNITED STATES PATENT OFFICE

EMANUEL MOCIGEMBA, OF RHEINBACH, GERMANY.

SCREW PUMP.

Application filed July 23, 1925. Serial No. 45,561.

*To all whom it may concern:*

Be it known that I, EMANUEL MOCIGEMBA, a citizen of the Republic of Germany, residing at Rheinbach, Germany, have invented new and useful Improvements in Screw Pumps (for which I have filed an application in Germany, M. 81,862, June 16, 1924), of which the following is a specification.

My invention relates to pumps and specifically to the type known as screw pumps.

Positive acting pumps comprising oppositely rotating intermeshing worm shafts are well known. One of the disadvantages of this type of pump lies in the fact that absolute contact between the teeth of one shaft and the grooves of the other is possible only in one plane, viz, a plane passing through the axes of both shafts. This is due to the nature of the warped surfaces constituting the sides of the teeth. As a result, a certain amount of leakage occurs through the contacting sides of the shafts from the high pressure end of the pump to the low pressure end thereof. This impairs the efficiency of the pump and prevents its use at high speeds or for high pressures.

The object of my invention is to obviate this disadvantage and I achieve this result by eliminating the true helical tooth of the ordinary type and substituting therefor a substantially helical and continuous tooth comprising alternate stepped portions parallel and perpendicular to the axis of the shaft. Accordingly, none of the sides of the teeth are warped surfaces but are planes, and absolute contact over a considerable area is thereby assured.

For the purpose of more fully describing my invention, reference will be had to the accompanying drawings, in which—

Fig. 1 is a plan view of a pump embodying my invention, partly in section;

Fig. 2 is a cross section taken along the line 2—2 of Fig. 1;

Figs. 3 and 4 are enlarged plan views of corresponding portions of the two improved worm shafts.

Referring to the drawings, 10 denotes a casing or housing of the usual type having bearings 11 in opposite ends thereof adapted to receive the opposite ends of the worm shafts. One of said bearings extends entirely through the end of the housing so that the shaft may extend therethrough and be connected with the driving means, as will be understood. At opposite ends of the housing are also the inlet and outlet openings 12 and 13.

Two intermeshing parallel worm shafts 14 and 15 are journalled in the bearings 11, and the housing is of such construction and shape as to closely embrace the outer peripheries of the shafts, as shown in Fig. 2. The shafts are provided with adjacent intermeshing spur gears 16 near one end of the housing whereby an opposite rotation is imparted to them by the driving of one of them.

Referring now to Figs. 3 and 4, each shaft is provided with a continuous helically disposed tooth 17 having alternate stepped portions 18, lying in planes perpendicular to the axes, and 19, lying in planes parallel to and passing through the axes. The side surfaces of these teeth are therefore plane surfaces, and positive intermeshing is thereby assured. It will be apparent from a consideration of Figs. 3 and 4 that the space between the raised portions of the tooth constitutes a continuous channel 20 through which the liquid being pumped is forced in a steady stream from one end to the other by the intermeshing tooth of the other shaft.

Thus if the arrows 21 of Figs. 1 and 2 denote the direction of turning, the liquid will be drawn into the inlet opening 12 and be forced through the channels 20 in a manner as indicated by arrows 22, to the outlet or discharge opening 13. During this passage, the absolute contact between the shafts along their intermeshing edges will prevent any leakage back from the pressure to the suction side.

I do not wish to limit myself to the actual structure illustrated, since it is conceivable that without departing from the spirit of the invention the worm shafts may be double or multi-threaded, or that the width of the tooth and groove may vary at different portions; for example the width may be slightly decreased toward the discharge side to accord with the increased pressure.

What I claim is:—

1. In a screw pump of the character described, a worm shaft in which the continuous helical tooth has alternate stepped portions parallel and perpendicular to the axis.

2. A screw pump comprising oppositely rotating intermeshing worm shafts, each of which has a continuous helical tooth having alternate stepped portions parallel and perpendicular to the axis.

In testimony whereof I affix my signature.

EMANUEL MOCIGEMBA.